United States Patent
Stroila (10) Patent No.: US 9,874,454 B2
(45) Date of Patent: Jan. 23, 2018

(54) COMMUNITY-BASED DATA FOR MAPPING SYSTEMS

(75) Inventor: Matei Stroila, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 977 days.

(21) Appl. No.: 13/005,686

(22) Filed: Jan. 13, 2011

(65) Prior Publication Data

US 2012/0183172 A1    Jul. 19, 2012

(51) Int. Cl.
*G06K 9/00* (2006.01)
*G01C 21/36* (2006.01)
*G06K 9/22* (2006.01)

(52) U.S. Cl.
CPC ..... *G01C 21/3602* (2013.01); *G06K 9/00671* (2013.01); *G06K 9/228* (2013.01)

(58) Field of Classification Search
USPC ...... 382/103, 104, 165, 305; 701/26, 1, 533, 701/300, 36, 538; 707/E17.018, 736
See application file for complete search history.

(56) References Cited

U.S. PATENT DOCUMENTS

| | | | |
|---|---|---|---|
| 7,274,380 B2 | 9/2007 | Navab et al. | |
| 7,511,736 B2 | 3/2009 | Benton | |
| 7,844,229 B2 | 11/2010 | Gyorfi et al. | |
| 2005/0015370 A1* | 1/2005 | Stavely et al. | 707/6 |
| 2007/0043504 A1* | 2/2007 | Dorfman et al. | 701/213 |
| 2007/0133874 A1* | 6/2007 | Bressan et al. | 382/181 |
| 2008/0147730 A1* | 6/2008 | Lee et al. | 707/104.1 |
| 2008/0317346 A1* | 12/2008 | Taub | 382/182 |
| 2010/0104187 A1* | 4/2010 | Broadbent | 382/176 |
| 2010/0257252 A1* | 10/2010 | Dougherty | G06K 9/00979 709/217 |

OTHER PUBLICATIONS

Augmented reality: A new way of seeing, by Steven K. Feiner, scientific american, Apr. 2002, pp. 50-55.*

* cited by examiner

*Primary Examiner* — Vikkram Bali
(74) *Attorney, Agent, or Firm* — Lempia Summerfield Katz LLC (57) ABSTRACT

Systems, devices, features, and methods for community-based collection and use of data for mapping and/or navigation are disclosed. For example, a method is provided for use of community-based data for mapping. A camera image from a mobile device is associated with a geographic location. A processor executes an image recognition algorithm on the camera image. An address or business logo in the camera image is identified with the image recognition algorithm. Address or business logo specific information is determined based on the address or logo and the geographic location. The specific information may be contact information or business operation information.

13 Claims, 2 Drawing Sheets

COMMUNITY-BASED DATA FOR MAPPING SYSTEMS

BACKGROUND OF THE INVENTION

The present invention generally relates to data content for use with navigation and/or mapping systems.

Navigation systems or devices provide useful features, including the identification of routes to destinations or points of interests. The navigation system can determine the optimum route to be taken by the end user to travel from the origin to the destination location from map data. A database of locations (nodes) and streets (links) is used by the navigation system. However, the mapping database has limited information. The entry of additional information may be time consuming and expensive.

SUMMARY OF THE INVENTION

In one aspect, a method is provided for use of community-based data for mapping. A camera image from a mobile device is associated with a geographic location. A processor executes an image recognition algorithm on the camera image. An address or business logo in the camera image is identified with the image recognition algorithm. Address or business logo specific information is determined based on the address or logo and the geographic location. The specific information is contact information or business operation information.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Accurate geo-located address and business logos data is difficult to collect either using automatic tools or manually. Using mobile augmented reality (MAR) applications, consumers may be encouraged to collect this data by offering personal and advertising services. The MAR applications facilitate community-based collection of this data and/or associated information. The data may be used for both business and personal consumers. The data may be collected, maintained, stored, or output as a service, such as associated with maintaining a database of mapping information.

The system facilitates data collection of difficult-to-collect data, like house numbers or business logos, and associated information, such as phone numbers, e-mail addresses, web addresses, or even WiFi base station information. The community collected data may be provided for personal and/or business uses, such as providing contact information with navigation information. Software developers or advertisers may use the information to output to mobile devices at the location for which the information is relevant.

In a business example, a business may send a logo and/or address in an image from a mobile device. The business also sends business operation information, such as a coupon or sale information. An augmented reality application may be used to transmit the image with the logo or address, geographical location at which the image was taken, and the business operation information. By providing this augmented reality function as a service, many different businesses may contribute to the collection. Using another or the same augmented reality application, a potential customer sends an image of the logo or address with geographic location information. The logo or address and location information are used to access the business operation information, which is then output to the potential customer. The mobile device of the potential customer displays the business operation information. The business may benefit by increasing the opportunity to sell products or services, since collected information is provided to the customer based merely on the customer taking a picture or video of the business logo or address. In alternative embodiments, an application other than augmented reality is used for communicating information.

In a personal use example, a user provides contact or other information (e.g., WiFi access information or a phone number) instead of business operation information. When a visitor sends an image of the user's address, the contact or other information is provided to the visitor. The visitor may contact the user without searching for their contacts or where the visitor does not otherwise have the contact information.

Figure 1:
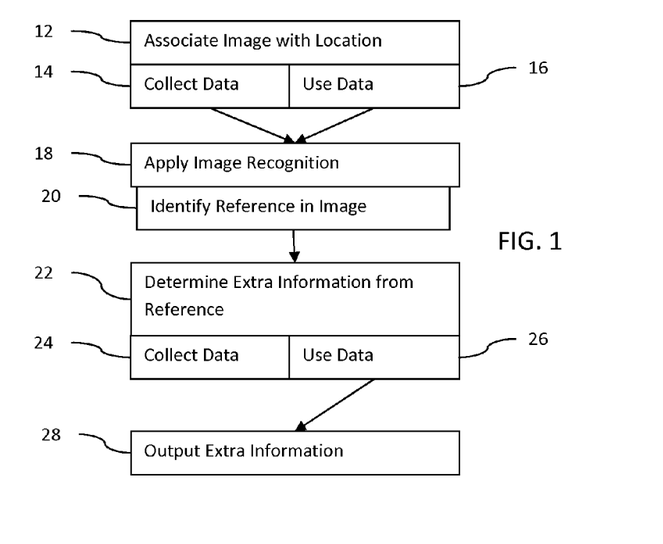
FIG. 1 illustrates a flow diagram of collection and use embodiments of a method involving community-based data with mapping.

FIG. 1 shows a method for use of community-based data with mapping. The method shows two different embodiments, one for collection of data and another for use of the collected data. Both embodiments may use output from mobile augmented reality or other applications to assist users. The mobile devices transmit images for detection of addresses, business logos or other reference information. Computer vision algorithms allow natural feature detection and tracking. Alternatively, using processors in mobile phones or other mobile devices, the reference information may be detected. By limiting the detection to specific reference information, such as addresses, business logos, or other synthetic textured planar surfaces, the reference information may be used to access community-collected information.

Additional, different, or fewer acts than shown in FIG. 1 may be used. For example, in one embodiment, acts 12, 14, 22, and 24 are performed as part of gathering specific information for a plurality of addresses and businesses. Residents of the addresses, operators of the businesses, or others provide specific information in addition to location, name, or picture information, such as providing business operation data or personal contact data. These acts are repeated to collect data for different addresses and businesses. As another example, in another embodiment, acts 12, 16, 18, 20, 22, 26, and 28 are performed as part of outputting the specific information to mobile devices of visitors to the addresses and businesses. These acts are repeated to output data for different visitors. In yet another example, acts 18 and 20, and/or act 28 are not provided.

FIG. 1 is from the context of a server or processor associated with a collector of data, such as a mapping database. In other embodiments, some or all of the acts are performed on a mobile device, such as acts 12, 14, 22, and 24 being performed on a mobile device collecting data or acts 12, 16, 18, and 20 being performed on a mobile device requesting data. The acts are performed in the order shown or a different order.

Furthermore, the acts below regarding data collection may be dependent on, a function of, or motivated by receiving a service, such as an augmented reality service. For example, a user may collect reference information, non-location information, geographic location information, and/or other data in exchange for having information (such as information associated with the user (or the data he collected) or information deemed significant by the user) placed in augment reality for the user and/or others to view. In one embodiment, a user may receive or be prompted with an offer, incentive, request, or message, such as via an email, text, or other digital communication (or other forms of communication, such as by personal visit, letter, phone call, etc.). The message or offer may be provided by a map developer, a service provider, and/or other entity (such as via a server or processor through a wired or wireless connection). The user may accept the received offer or message, such as by selecting acceptance on a user interface, sending a reply to the offer, and/or collecting and sending the requested data. In exchange for the collected data, the map developer or other entity puts the collected data and/or information associated with the collected data in augmented reality (such as via a server/processing system).

For example, a user is requested to collect and send his business address (and/or other geographical address, point address, reference information, or geographic location information) in exchange for having information about the business or address or people thereof (such as hours of operation, location information, non-location information, advertisement(s), personal information, phone number, and/or other information) placed in augmented reality. The user collects the business address information, such as via an imaging operation, and transmits the data to the map developer or service provider (e.g., the device used to collect and transmit the data may be the same device the user received the incentive or request message on). The collected business address information is placed in a map database/system by the developer, and then the developer places information about the business or people thereof (received by the user or by other source) in an augmented reality program wherein the user and/or others (such as the general public) may use one or more devices to view the information in augmented reality via an augmented reality application supplied by the developer/provider or other application (in one example, only an augmented reality application provided by the developer or entity that provided the incentive may be used). For example, the user or someone else walks up to the user's business and places his phone or device by the business address or other area, and when the augmented reality application is active, the user or other person can view the hours of operation, location information, non-location information, advertisement(s), phone number, and/or other information associated with the business address or business via augmented reality. Other embodiments of this incentive model may be realized based on the different features (hardware and/or software) and information/data disclosed herein.

In act 12, a camera image from a mobile device is associated with a geographic location. The association occurs in the mobile device. For example, the mobile device tags an image with the geographic coordinates when the image was captured. Alternatively or additionally, the association occurs in a server or processor remote from the mobile device. For example, a server receives a camera image and geographic location information from a mobile device and associates the two pieces of information together, such as based on a data format or programming.

The association is a cross-referencing or linking, such as determining that a particular image corresponds with a particular geographic location. The association may be made by storing the types of data together. The association may be made by receiving the image and the geographic location in a same packet of information. Direct association between the image and the location may be made. Alternatively, indirect association is used, such as linking the location and reference information from the image rather than linking to the image.

The image is of reference information. The reference information may be linked to other specific information being collected. For example, three or more types of data are collected and associated, such as reference information, non-location information associated with the reference, and geographic location information. Reference information includes addresses, business logos, or other data referring to a specific geographic entity. The geographic location is a coordinate, such as longitude, latitude, and/or altitude, a node referenced to a mapping database, or other indicator of location.

Non-location data is information specific information to a business or person, such as contact information, coupons, or WiFi information. The non-location information includes information not used for navigating or mapping. The information is about people, businesses, or other entities rather than the location of such entities. The specific or non-location information is to be collected, and the geographic location and reference image information are used to assist in the collection of the specific information. The image may be collected as well, such as for later matching with other images or outputting as part of navigating to that destination. The non-location information is collected for different businesses or people. For example, any business wanting to take advantage of distribution of the non-location information provides the non-location information with associated image and geographic location data.

For a residential address, the personal information (e.g., non-location information about a person) may be any information that a user wants to share, such as a link to social media pages (e.g., a uniform resource locator link (url)), a phone number, an e-mail address, or a name. For a business address or logo, specific information for a business may be operation information that a business is to share, such as a phone number, an e-mail address, hours of operation, a directory (e.g., list of employees and phone numbers), an image, a menu, real-estate history, an advertisement, a coupon, other incentive, or a url link for the business or to a review cite. Other non-location data may be added by the user or automatically detected. For example, a mobile device with WiFi capability detects a wireless access point. The name, signal strength, whether the mobile device is connected to the access point, or other information about the access point is provided as non-location data.

In one embodiment represented in act 14, the association occurs as part of community-based collection of information. To collect this data, users upload a geo-referenced image of the house number (address) or logo and corresponding information that other users can later find using a mobile augmented reality or other application in the viewfinder of a mobile device. The non-location information is added automatically or manually. For example, the mobile augmented reality application accesses contact information associated with an address automatically, or the user manually links a contact or inputs the contact information. One or more files, such as a .pdf file for a coupon, may be uploaded to the mobile device and linked to the image.

Figure 2:
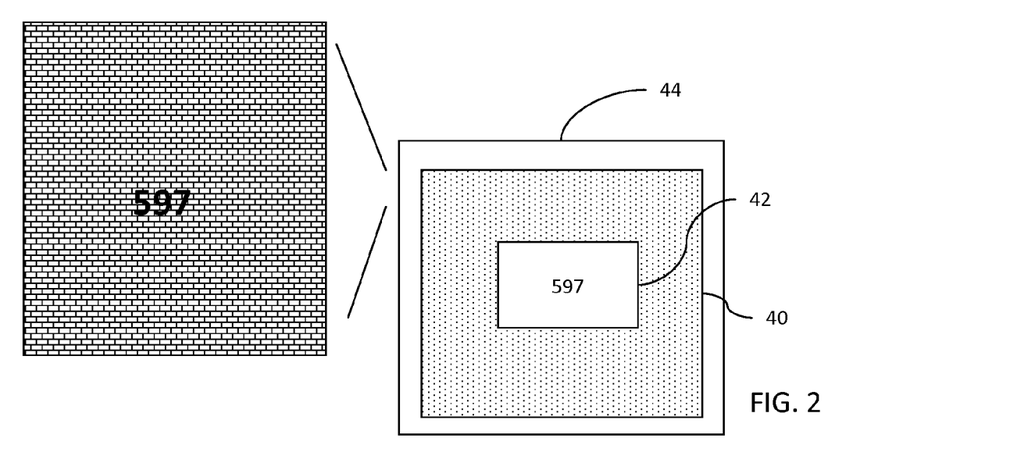
FIG. 2 illustrates a mobile device viewing an address.

For a given address or business logo, a user captures a camera image of the address or business logo at the appropriate location. A user points a phone camera at a specific point of interest, such as the reference. FIG. 2 illustrates a mobile device 44 imaging an address (e.g., "597"). A user may point the mobile device 44 at the address in order to capture an image 40 of the address 42. The address may be on a wall, on a mailbox, on a curb, or even written on a piece of paper. The image 40 is displayed on a screen (user interface). The mobile device 44 runs a viewing application configured to capture an image of the address or other reference information. A viewing application is any application that utilizes a camera, such as a camera or video function. The viewing application may be an augmented reality application.

The image 40 may incorporate other features. The user may draw a bounding box around the reference with a finger, stylus, buttons, cursor arrows or other input device. The bounding box is similar in size and shape as the reference, such as just surrounding an address on the image 40. The bounding box is of an any shape or size. The bounding box may delineate the point of interest, allowing more efficient image processing.

The camera captures the image 40 of the reference, and the mobile device 44 sends the captured image to a map developer or other service provider. The mobile device 44 associates the image 40 with a geographic location. For example, image 40 is tagged with the GPS coordinates, cellular determined coordinates, or other location information. As another example, the image 40 and geographic location are packaged pursuant to a format.

A server of the map developer receives the camera image 40. The camera image is received with the geographic location of the mobile device 44 when the image was captured. Alternatively, the map developer receives reference information extracted from the image by the processor or input by the user of the mobile device 44.

The server also receives non-location information about the reference. For example, images of address numbers and/or business logos are received from many mobile devices of users. These images are received with the geographic locations and personal contact or business operating information for each of the users.

In the embodiment for the use of already collected information, the image or extracted reference information and the location are received as a request for the non-location information. The server associates the image with a location in act 16. The user captures an image of the reference. The location of the mobile device at the time of the image capture is recorded, linked to the image, or embedded with the image data. The same or different mobile augmented reality application used for collection may also be used to access collected information. Alternatively, the user texts, emails, or otherwise causes the mobile device to transmit the image and geographic location. Unlike the collection of information, non-location data is not provided with the image.

The server of the service provider, such as the map provider, receives the camera image with the geographic location. The image is associated with the geographic location. Where the image and location are received together, the association may occur upon receipt by recognition that both types of information for a same request have been received. If received separately, the server may use header information or other identifiers to associate the image with the geographic location.

In act 18, a processor, such as the server, executes an image recognition algorithm on the camera image. The processor performs instructions for extracting the reference from the image. Any now known or later developed image recognition algorithm may be used. For example, the image is low pass filtered to remove higher frequency background information. Optical character recognition (OCR) may be applied to the image after filtering for extracting address or other alphanumeric text. Alternatively or additionally, pattern matching is applied. A template, such as of a business logo, is translated, rotated and scaled over various iterations. Different templates are matched. A similarity calculation, such as the minimum sum of absolute differences, is performed for each iteration. The template with the greatest correlation is identified as the match. Another pattern matching algorithm relies on feature extraction. The image is filtered or processed to determine various characteristics. Scale-invariant feature transform (SIFT) or speeded up robust features (SURF) may be used. The values for the characteristics are matched against the values for characteristics of known references. The reference with the greatest and/or sufficient correlation of features is identified as the match. The comparison may be governed by a matching constraint. The matching constraint may define a number of points required to trigger a match, a threshold level between intensities that defines the differing points, or a confidence level of the comparison. Other matching algorithms may be used, such as 3D to 2D edge matching.

In alternative embodiments, the image recognition is not performed. Instead, the image of the reference is stored during collection. For use of the collected data, a received image is compared with the stored image as part of the image recognition algorithm. The goal is to establish a match of the reference information rather than to extract text. Due to the location information, the number of comparisons or possible matches is limited.

In act 20, the address, business logo, or other reference from the image is identified. The output of the image recognition algorithm is text, a match, or other identification of the reference. For example, a sequence of numbers is identified or the logo of a particular business is identified. To identify the reference, the reference is extracted from the image or a match is made. The image recognition algorithm outputs the address or business identity or that a match has been made.

In act 22, the non-location information is determined based, at least in part, on the identified address or logo. The specific information associated with the reference is stored in the database. The reference is used to look-up the specific information from the database. For example, a match to an image at a location identifies the reference. The database is queried by the identified reference (e.g., queried for the information associated with the matched image of the reference).

The non-location information may also be determined with the geographic location. The reference information is used with the geographic information since a particular location may be associated with multiple addresses or businesses or the exact location of a given address or business may not be known, such as where address locations are estimated. The geographic location may be used with the reference since the reference may not be location specific. An address may or may not include a street name and likely does not include a city, state or country. A business logo may be for a business with multiple locations. By using the reference and geographic location, the non-location information for a unique building or business location may be determined. For example, multiple images may be associated with a same geographic location. The images of the reference are matched to identify the desired reference. The database is queried using the geographic location and reference.

In act 24, the non-location information is determined as part of the collection of the non-location information. The determination may be extraction of the non-location information from one or more packets of data. The determination may be identifying a file or storage location containing the non-location information. The non-location information is received with the image and geographic location, but may be received separately. With these three or more types of information being linked, the non-location information is determined by format, header, or other indicator distinguishing the non-location information from other information.

The determined non-location information may be processed. For example, some types of non-location information may not be acceptable, such as a picture of a child. Information not to be maintained in the database is removed or not stored. As another example, the non-location information may be reformatted or compressed.

A database is populated with the non-location information. The specific information for each reference is linked with the geographic location in a mapping database. The non-location and reference information (e.g., image) are stored into the database. If the database is a mapping database, the non-location information may be linked to a node or specific location. If the non-location information is stored in a separate database, the non-location information is stored with the geographic location and reference for later queries. The database is populated to be queried by the reference and the geographic location.

Personal contact information, business operating information, or other non-location information for a plurality of users is stored for later query. Millions or other numbers of geo-referenced addresses or business logos with attached extra-information (images, phone numbers, directories, or web addresses) may be collected. People or businesses contribute to the collection, reducing the cost and time for collecting the information.

The collection may provide more accurate routing. Where the locations associated with addresses are estimated in a mapping database, the accurate locations may be determined. The reference provides the address. The geographic location indicates the accurate location of the address. The estimate for the address location is replaced with the actual location. The existing address data may be audited or updated. Other attributes in a mapping database may be updated using the collected images.

By providing a service, non-location data is collected. To simplify the user's experience in providing the non-location data, an application may be provided for users' mobile devices. The users may provide the information to help others or to help themselves. Users may be encouraged to provide the non-location data. A business may provide the business operating information as a way of marketing or advertising. By providing information for the database, that information may then be provided to encourage customers to visit the business. Prices, virtual currency, coupons, or other incentives may be provided for anyone contributing to the collection.

In act 26, the non-location information is determined for output to other users. The database is used to look-up information to be provided to other users. For example, augmented reality applications on other mobile devices provide reference (e.g., an image of the reference) and location information to access the non-location information in the database. Since the geographic location is provided, the search space for the reference in the database is reduced or limited. The specific (i.e., non-location) information for a reference is obtained from the mapping or other database.

A user may simply view a house number, sign, or other point of interest in a phone's viewfinder. Augmented reality on the captured image or transmission of a request with a stored image initiates obtaining the non-location data. The non-location data is determined from the image and the geographic location. From the user's perspective, merely aiming the camera results in obtaining additional data, such as contact information or advertisements. The user may be required to activate the camera or authorize the query in other embodiments. The application on the user's mobile device obtains attached information, such as a coupon, based on imaging an object of interest. For example, a user visits a residential house or business place. By simply viewing the address number on the phone, the user is provided contact information, so is able to make a call or get access to other data or services (e.g., launch restaurant reviews from Yelp) with no typing required.

In act 28, the information specific to the reference is output to the mobile device. This output is provided to any mobile device, such as during collection to confirm receipt or operation of the system or during later use to assist a visitor. For example, one user collects and transmits non-location information to a server. The mobile device of a different user or visitor later transmits an image of the reference and a geographic location. The non-location information is transmitted to the mobile device of the different user or visitor. Due to community based collection, specific information for different addresses and businesses may be output to mobile devices of visitors.

The output is provided on a display of the mobile device. For example, the non-location data is output to an augmented reality application of the mobile device. The non-location data is overlaid on a camera image, provided as a text box, displayed alone, or linked to an email, text or other communication. The output may be other than augmented reality, such as outputting the non-location data over or linked to a map in a navigation application.

All of the non-location data is output. In other embodiments, the server only provides some and not other non-location data. The user may configure the application on the mobile device to filter the non-location information.

Figure 3:
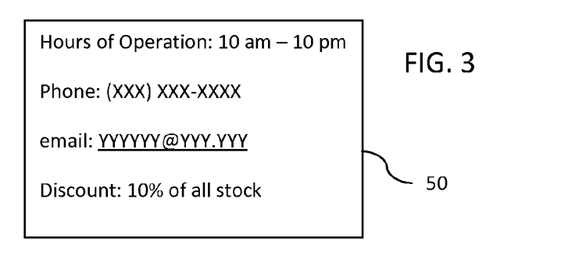
FIG. 3 illustrates an example output to a mobile device of collected business information.

Once the reference is identified, the information specific to the reference is displayed. FIG. 3 shows an example output on a display 50. The non-location data is transmitted to an augmented reality application, which outputs contact information to a user of the mobile device. The contact information is for the reference. In the example of FIG. 3, the contact information is business operation information, providing phone number, email, hours of operation and sale information. Coupons and/or advertisements may be output based on location and/or user interest. In an example using a residence, the contact information may include a phone number or other personal contact information. The visitor may call the phone number to let the resident know they are outside.

The non-location information may have other uses. Instead of or in addition to displaying the information, the information may be used. For example, the phone number for a residence is not displayed, but a "door bell" button is overlaid on the display. By activating the door bell on the mobile device, a text or call is placed to the resident. Other applications or uses of the non-location information may be provided.

Figure 4:
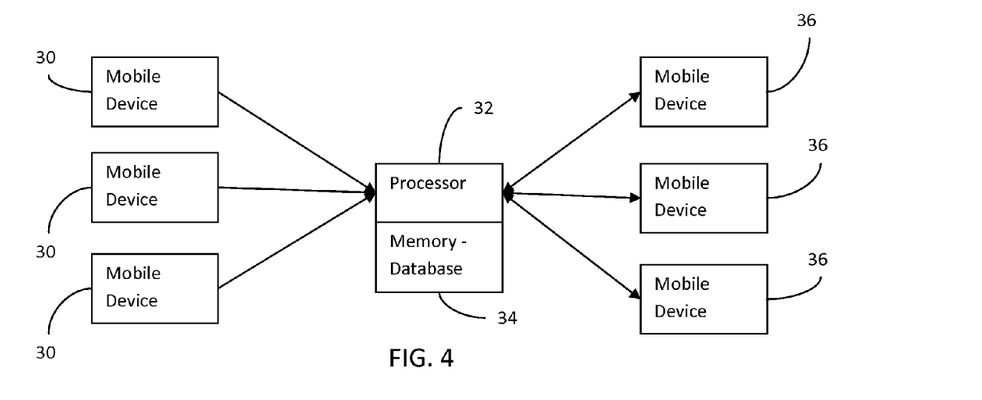
FIG. 4 illustrates a block diagram of one embodiment of a system for community-based collection and use of non-location data.

FIG. 4 illustrates a system or network for mapping with community-based data. The network includes mobile devices 30 for collecting information, mobile devices 36 for receiving information, and a processor 32 and a memory 34 for storing the information received from the mobile devices 30 and outputting the information to the mobile devices 36. Additional, different, or fewer components may be provided. For example, one or more mobile devices 30 for collecting may also receive information, and one or more mobile devices 36 for receiving information may also collect information. Additional mobile devices 30, 36, and/or processors 32 and memories 34 may be provided.

In one embodiment, the processor 32 and memory 34 are part of a server and database provided as a service, such as a service provided by a map developer. The processor 32 implements the acts of FIG. 1, but the mobile devices 30, 36 may perform one or more acts, such as associating the image with a location and/or applying image recognition and identifying the reference. In alternative embodiments, the processor 32 and memory 34 are part of one or more mobile devices.

The mobile devices 30, 36 may be cellular telephones, mobile phones, smart phones, personal digital assistants ("PDA"), cameras, tablet computers, laptops, personal navigation devices ("PND"), portable navigation devices, and/or any other electronic device capable of capturing an image. The mobile devices 30, 36 include a network interface for wirelessly or wired connection to the processor 32. The mobile devices communicate over a network. Any protocol or physical connection may be used to couple the processor 32 to the mobile devices 30, 36. The communication paths may utilize cellular (e.g. 3G, 4G, or WiMAX), Ethernet, wireless, or any Internet protocol technologies. Alternatively, the communications network may be a private network that may not be connected to the Internet, a peer to peer network, or an ad-hoc network, such as a mobile mesh network including mobile devices and wireless links. In other embodiments, one or more of the mobile devices 30, 36 are connected through a wire, such as USB cable. For example, the captured image of the reference information is stored in the mobile device 30, 36 and downloaded to the processor 32 once the mobile device 30, 36 connects using a wired or wireless path.

The mobile devices 30, 36 each include a controller, a memory, an input device, a communication interface, position circuitry, a camera, and a display. Additional, different, or fewer components may be provided.

The controller may include a general processor, digital signal processor, an application specific integrated circuit (ASIC), field programmable gate array, analog circuit, digital circuit, combinations thereof, or other now known or later developed processor. The controller may be a single device or combinations of devices, such as associated with a network, distributed processing, or cloud computing.

The memory may be a volatile memory or a non-volatile memory. The memory may include one or more of a read only memory (ROM), random access memory (RAM), a flash memory, an electronic erasable program read only memory (EEPROM), or other type of memory. The memory may be removable from the mobile device, such as a secure digital (SD) memory card.

The input device may be one or more buttons, keypad, keyboard, mouse, stylist pen, trackball, rocker switch, touch pad, voice recognition circuit, or other device or component for inputting data to the mobile device 30, 36. The input device and the display may be combined as a touch screen, which may be capacitive or resistive. The display may be a liquid crystal display (LCD) panel, light emitting diode (LED) screen, thin film transistor screen, or another type of display.

The communication interface may include any operable connection. An operable connection may be one in which signals, physical communications, and/or logical communications may be sent and/or received. An operable connection may include a physical interface, an electrical interface, and/or a data interface. The communication interface provides for wireless and/or wired communications in any now known or later developed format. The same or different communications interface may be provided with the processor 32.

The position circuitry may include one or more of a variety of location algorithms. The Global Positioning System (GPS) is a satellite based system provides reliable and accurate positioning but has limitations in indoor environments. However, GPS may be combined with or replaced by other location algorithms to provide accurate positioning. Cellular or other positioning systems may be used as an alternative to GPS. Other global navigation satellite systems such as the Russian GLONASS or European Galileo may be used. In some implementations, the position circuitry may be omitted.

One example of a location algorithm is triangulation. In triangulation, the position circuitry includes a signal strength sensor or an array of signal strength sensors configured to measure the signal level from two or more antenna. The controller calculates the position of the mobile device 30, 36 from the signal strength measurements. Triangulation may be used in cellular networks, Bluetooth, or in wireless LAN and wireless mesh, as described in the IEEE 802.11 family of standards.

In addition or in the alternative to a signal strength sensor, the position circuitry may include a timer configured to measure the time necessary for a response from the network. The controller may estimate the position of the mobile device from the change in response times or by comparing response times from a plurality of antenna or access points.

Another example of a location algorithm is proximity detection. A plurality of antenna is configured into a grid or other pattern. The position circuitry detects the closest antenna and the controller estimates the location of the mobile device 30, 36. Proximity detection is limited by the density of the pattern of antenna. However, inexpensive technologies such as radio frequency identification (RFID) are suited for dense grids of antenna.

The position circuitry may also include relative position sensors in an inertial position system or dead reckoning system. Relative positions sensors include but are not limited to magnetic sensors (e.g., magnetometers, compasses), accelerometers, gyroscopes, and altimeters. Magnetic sensors determine the direction and or strength of a magnetic field and can be used to determine heading or orientation. Inertial sensors such as accelerometers and gyroscopes measure acceleration, which can be used to calculate position, orientation, and velocity (direction and speed of movement) of the mobile device 30, 36. An altimeter is a pressure sensor used to determine the relative altitude of the mobile device, which may be used to determine the vertical location of the mobile device within a building.

The camera may be configured to capture still and/or video images. The camera includes, but is not limited to, a lens and circuitry for taking pictures. Additional, fewer, or different components may be provided. For example, a flash or flash circuitry may be provided. The camera may be positioned so that the lens is facing away from the display or is facing the same direction as the display. Alternatively, the camera may be positioned in or configured to move in and face any number of directions. The camera may capture images without taking a picture. The user may activate the camera to take a picture, placing the image into a long term memory.

An augmented reality application may be stored in the memory and executed by the controller. The augmented reality application enhances a user's view of the real world with virtual content. The virtual content is displayed in a layer above the real world content, which is captured by the camera. The virtual content provides information regarding the real world content. The virtual content may include non-location information, such as contact information or business operation information. Other examples of the virtual information include phone numbers, hours of operation, menus, prices, reviews, and other information.

The augmented reality application is an example of a viewing application. A viewing application is any program that enables the mobile device to receive image data or to output image data. The simplest viewing application is a camera application. Even when the camera is not taking a picture, image data may be captured or analyzed as the mobile device 30, 36 is panned around to display an image of a real world scene on the display.

The viewing application may be compatible with a Windows operating system, a Symbian operating system, an Android operating system, iOS, and/or other operating systems. Examples of augmented reality applications include Wikitude, Layar Reality Browser, Cyclopedia, and Nearest Places.

The processor 32 interacts with the memory 34. In one embodiment, the memory 34 is a local memory. For example, the memory 34 stores an image to which the processor 32 is applying an image recognition algorithm. The memory 34 is configured to store a captured image from a mobile device. The image of the identifying information, such as an address, is stored for image processing to extract or match the identifying information. The memory 34 also stores the geographical location associated with the image or identifying information. The stored location is used to store or look up the non-location data in a database.

In other embodiments, the memory 34 is additionally or alternatively a database, such as a database storing non-location data referenced by geographical location and reference (e.g., image or extracted identifying information). The database 34 may be a map database, including map or navigation data used for navigation-related services. The map data may include segment and node information. Other formats may be used for the map data. The map database 34 may include image-related information, such as features extracted from previously captured images or previously recognized images, which may be matched with features of the captured image of the reference based on location, orientation, and scale. The geographic database 34 may be a memory, hard drive, flash drive, or any storage device.

The map database 34 may be produced and/or maintained by a map developer, such as NAVTEQ North America, LLC located in Chicago, Ill. In other embodiments, a service provider maintains the database, but not necessarily with map information. For example, a service provider other than a map developer creates the database of non-location information stored by location and reference.

The processor 32 is a processor for a server, computer, workstation or other device. For example, the processor 32 is a controller, general processor, digital signal processor, an application specific integrated circuit (ASIC), field programmable gate array, analog circuit, digital circuit, combinations thereof, or other now known or later developed processor. The processor 32 may be a single device or combinations of devices, such as associated with a network, distributed processing, or cloud computing. The processor 32 may include or be connected with a communications interface. Additional, different, or fewer components may be used.

The processor 32 is configured by software and/or hardware to associate images with locations, to apply image recognition to identify a reference in an image, to determine contact or business operation information other than a location based on the location and reference, and to output the contact or business operation information in the collection and/or use of non-location information. In the alternative, some of the processing is performed by the one or more mobile devices 30, 36. For example, the mobile device 30, 36 may extract reference information and associate the reference information with the location such that the processor 32 merely interacts with the database to locate and output or to store the contact or business operation information.

In one embodiment, the processor 32 is configured to execute an image recognition algorithm on a captured image of identifying information. The image recognition algorithm is configured to extract the identifying information. For example, one of the mobile devices 30, 36 captures an image of an address or business logo. The processor 32 receives the captured image and executes the image recognition algorithm to identify the address or logo. The address or logo is identified by matching, but may be identified by extracting text.

The processor 32 is configured to connect additional information with a geographical location. The additional information is information provided from a user associated with the identifying information. The user associated with a business or address provides non-location information, such as a phone number, an e-mail address, a uniform resource locator link, a directory, a menu, a coupon, hours of operation, an incentive, or combinations thereof. The additional information is connected to the identifying information output from the image recognition algorithm. The connections are made in the data format and/or in a database.

For the collection of the user provided additional information, the processor 32 is configured to receive the captured image and the additional information from the user and configured to store the additional information and image or extracted reference in the database. The additional information is linked to the geographic location when received or as stored. The receiving and storing is performed for additional information and different geographical locations from different users.

For the use of the user provided additional information, the processor 32 is configured to receive another captured image of the identifying information from a different user, extract the identifying information from the other capture image or identify through matching, look-up the additional information from the user in the database, and output the additional information to the other user. The processor 32 connects the additional information with the received identifying information and geographic location by looking up the additional information based on a match or extraction of the identifying information and based on the geographic location. Once connected, the additional information is output to the other user.

Additional augmented reality information may be combined with any of the embodiments discussed above. Augmented reality information may be overlaid with the user collected non-location information. For example, the mobile device 30, 36 may highlight businesses that the user has been to before, the restaurants matching the user's tastes, or the most common destinations near a location. The mobile device 30, 36 also presents contact or business operation information to the user.

The embodiments described above may be implemented using computer executable instructions stored in the memory 34 and/or the memory or a mobile device, which are non-transitory. The processors may execute computer executable instructions for associating non-location data with geographical data. The computer executable instructions may be written in any computer language, such as C++, C#, Java, Pascal, Visual Basic, Perl, HyperText Markup Language (HTML), JavaScript, assembly language, extensible markup language (XML) and any combination thereof.

The computer executable instructions may be logic encoded in one or more tangible media or one or more non-transitory tangible media for execution by the processors. Logic encoded in one or more tangible media for execution may be defined as instructions that are executable by the processors and that are provided on the computer-readable storage media, memories, or a combination thereof. Instructions for instructing a network device may be stored on any logic. As used herein, "logic", includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The computer readable instructions may be stored on any non-transitory computer readable medium. A non-transitory computer readable medium may include, but are not limited to, a floppy disk, a hard disk, an ASIC, a compact disk, other optical medium, a random access memory (RAM), a read only memory (ROM), a memory chip or card, a memory stick, and other media from which a computer, a processor or other electronic device can read.

As used herein, the phrases "in communication" and "couple" are defined to mean directly connected to or indirectly connected through one or more intermediate components. Such intermediate components may include both hardware and software based components.

Various embodiments described herein can be used alone or in combination with one another. The foregoing detailed description has described only a few of the many possible implementations of the present invention. For this reason, this detailed description is intended by way of illustration, and not by way of limitation.

I claim:

1. A method comprising:
providing a mobile augmented reality service to a first mobile device;
receiving a first camera image from the first mobile device through the augmented reality service;
associating the first camera image from the first mobile device with a first geographic location;
executing, with a processor, an image recognition algorithm on the first camera image;
detecting, with the processor, an address or business logo from the first camera image using the image recognition algorithm;
receiving, from the first mobile device through the augmented reality service, additional information not otherwise determinable by the first camera image or the first geographic location;
associating the additional information with the address or business logo from the first camera image and the first geographic location;
storing the additional information in connection with the first geographic location associated with the first camera image and the address or business logo from the first camera image in a map database;
receiving a second camera image from a second mobile device through the augmented reality service;
associating the second camera image from the second mobile device with a second geographic location;
executing, with a processor, an image recognition algorithm on the second camera image;
detecting, with the processor, an address or business logo from the second camera image using the image recognition algorithm;
matching, with the processor, the address or business logo and the second geographic location from the second camera image with the address or business logo and the first geographic location from the first camera image;
querying the map database for the additional information based on the matched address or business logo and geographic locations;
identifying, with the processor, the additional information associated with the second camera image;
generating data for overlay on the second camera image of a viewfinder using the augmented reality service at the second mobile device, the data including at least the additional information; and
sending the data for overlay to the second mobile device.

2. The method of claim 1, further comprising:
limiting a search space in the map database for the address or business logo based on the first geographic location, the second geographic location, or combinations thereof.

3. The method of claim 1, wherein the second mobile device is configured to initiate a communication based on the additional information overlaid on the second camera image.

4. The method of claim 1, wherein the second mobile device is configured to initiate an application based on the additional information overlaid on the second camera image.

5. The method of claim 1, wherein the additional information is a phone number or an email address.

6. The method of claim 1, wherein the data for overlay includes a door bell button associated with the additional information, wherein the door bell button is configured to initiate a communication based on the associated additional information when activated.

7. An apparatus comprising:
at least one processor; and
at least one memory including computer program code for one or more programs;
the at least one memory and the computer program code configured to, with the at least one processor, cause the apparatus to at least perform:
providing a mobile service to a first mobile device;
receiving a first camera image from the first mobile device through the mobile service;

associating the first camera image from the first mobile device with a first geographic location;
executing, with a processor, an image recognition algorithm on the first camera image;
detecting, with the processor, an address or business logo from the first camera image using the image recognition algorithm;
receiving, from the first mobile device through the mobile service, additional information not otherwise determinable by the first camera image or the first geographic location;
associating the additional information with the address or business logo from the first camera image and the first geographic location;
storing the additional information in connection with the geographic location associated with the first camera image and the address or business logo from the first camera image in a map database;
receiving a second camera image from a second mobile device through the mobile service;
associating the second camera image from the second mobile device with a second geographic location;
executing, with a processor, an image recognition algorithm on the second camera image;
detecting, with the processor, an address or business logo from the second camera image using the image recognition algorithm;
matching, with the processor, the address or business logo and the second geographic location from the second camera image with the address or business logo and the first geographic location from the first camera image;
querying the map database for the additional information based on the matched address or business logo and geographic locations;
identifying, with the processor, the additional information associated with the second camera image; and
generating data for overlay on the second camera image collected at the second mobile device, the data including at least the additional information.

8. The apparatus of claim 7, further comprising:
a communication interface configured to send the data for overlay to the second mobile device through the mobile service.

9. The apparatus of claim 7, the at least one memory and the computer program code configured to, with the at least one processor, cause the apparatus to at least perform:
limiting a search space in the map database for the address or business logo based on the first geographic location, the second geographic location, or combinations thereof.

10. The apparatus of claim 7, wherein the second mobile device is configured to initiate a communication based on the additional information overlaid on the second camera image.

11. The apparatus of claim 7, wherein the second mobile device is configured to initiate an application based on the additional information overlaid on the second camera image.

12. The apparatus of claim 7, wherein the mobile service is an augmented reality application.

13. The apparatus of claim 7, wherein the mobile service is a navigation application.

* * * * *